(12) United States Patent
Herzi

(10) Patent No.: US 9,606,884 B2
(45) Date of Patent: Mar. 28, 2017

(54) METHOD AND SYSTEM FOR REMOTE DIAGNOSTICS OF A DISPLAY DEVICE

(71) Applicant: Dell Products, L.P., Round Rock, TX (US)

(72) Inventor: Dirie N. Herzi, Leander, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 171 days.

(21) Appl. No.: 14/515,302

(22) Filed: Oct. 15, 2014

(65) Prior Publication Data

US 2016/0110273 A1 Apr. 21, 2016

(51) Int. Cl.
| | |
|---|---|
| *G06F 11/00* | (2006.01) |
| *G06F 11/22* | (2006.01) |
| *H04L 29/08* | (2006.01) |
| *G06F 17/30* | (2006.01) |

(52) U.S. Cl.
CPC ...... *G06F 11/2221* (2013.01); *G06F 11/2284* (2013.01); *G06F 11/2294* (2013.01); *G06F 17/30896* (2013.01); *H04L 67/02* (2013.01); *H04L 67/104* (2013.01)

(58) Field of Classification Search
CPC .... G06F 11/263; G06F 11/2205; G06F 11/22; G06F 11/2257; G06F 11/2284; G06F 11/321; G06F 17/30896; G06F 11/2221; G06F 11/2294; H04L 67/02; H04L 67/104

USPC .. 714/27, 25, 4.4, 26, 28, 36, 44, 46, 48, 57
See application file for complete search history.

(56) References Cited

U.S. PATENT DOCUMENTS

| | | | | |
|---|---|---|---|---|
| 6,145,102 A | * | 11/2000 | Klein | G06F 11/0745 714/47.1 |
| 2005/0120273 A1 | * | 6/2005 | Hudson | G06F 11/0748 714/38.11 |
| 2008/0072107 A1 | * | 3/2008 | Jung | G06F 11/0742 714/57 |
| 2013/0151900 A1 | * | 6/2013 | Wang | G06F 11/321 714/27 |
| 2013/0288601 A1 | * | 10/2013 | Chhabra | H04W 4/001 455/41.2 |
| 2014/0340701 A1 | * | 11/2014 | Okamura | G06F 3/121 358/1.14 |

\* cited by examiner

*Primary Examiner* — Joseph D Manoskey
(74) *Attorney, Agent, or Firm* — Norton Rose Fulbright US LLP

(57) ABSTRACT

In one embodiment a method of remotely communicating with an information handling system may include a first processing device executing one or more diagnostic routines in response to an error signal corresponding to a failure of an integrated display of a first information handling system. The first processing device may establish a peer to peer connection. The first information handling system may connect remotely to a second information handling system via the peer to peer connection. A web browser of the second information handling system may receive and display a HyperText Markup Language (HTML) page that may include an error description and a diagnostic log corresponding to the failure of the integrated display.

20 Claims, 7 Drawing Sheets

METHOD AND SYSTEM FOR REMOTE DIAGNOSTICS OF A DISPLAY DEVICE

FIELD

This disclosure relates generally to information handling systems, and more specifically, to a method and system for remote diagnostics of a display device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system typically includes a display device that provides visual output to a user. The display may be integrated within the information handling system, for example an integrated Liquid Crystal Display (LCD) in a laptop computer or a tablet device, or the display may be an external unit connected to the information handling system. If the display malfunctions it can be difficult to accurately diagnose the cause, particularly if the malfunction is preventing error messages and other output data from being visible on the display.

Conventional methods of troubleshooting a malfunctioning display involve the use of audible beep codes and/or Light Emitting Diode (LED) codes, where a predetermined number of beeps and/or LED flashes emitted by the information handling system represents the type of error that is causing the display malfunction. However, beep codes and LED codes are both inherently cryptic in nature and thus require the user to call a technical support representative for further assistance.

SUMMARY

In one embodiment, a method of remotely communicating with an information handling device may include a first processing device executing one or more diagnostic routines in response to an error signal that corresponds to a failure of an integrated display of a first information handling device. In an embodiment the first processing device may generate the error signal automatically in response to detecting the failure of the integrated display. In another embodiment the first processing device may generate the error signal in response to a user of the first information handling device pressing a pre-defined key combination on a user input device of the first information handling device.

In one embodiment the first processing device may establish a peer to peer connection. The first information handling device may thereby connect remotely to a second information handling device via the peer to peer connection. In one embodiment a web browser of the second information handling device may receive and display a HyperText Markup Language (HTML) page from the first information handling device. The HTML page may include an error description and/or a diagnostic log with information corresponding to the failure of the integrated display. In one embodiment the HTML page may include an Artificial Intelligence (AI) dialog with one or more suggested troubleshooting steps to facilitate repairs to the display device. The troubleshooting steps may include location-based information specific to the Internet Protocol (IP) address of the first information handling device.

In an embodiment the first processing device may include a Basic Input/Output System (BIOS). Executing the one or more diagnostic routines may include initializing or rebooting the first information handling device. Establishing the peer to peer connection may include a Wi-Fi driver entering a wireless access point mode of the first information handling device. In another embodiment establishing the peer to peer connection may include the first processing device announcing the failure of the integrated display via a multicast Domain Name System (mDNS) to one or more external devices connected to the same network as the first information handling device. In yet another embodiment a mobile application installed on the second information handling device may enable two-way control of the first information handling device via the peer to peer connection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
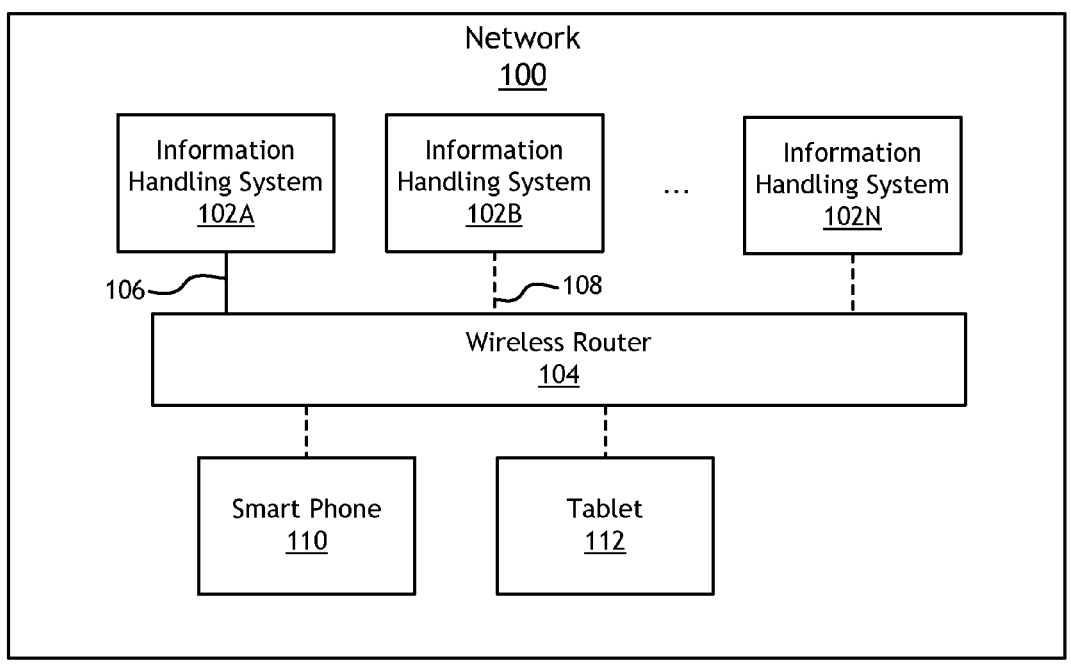
FIG. 1 is a schematic block diagram illustrating one embodiment of an information handling system for remote diagnostics of a display device.

Embodiments of methods and systems for a method and system for remote diagnostics of a display device are described. In an embodiment, an Information Handling System (IHS) with a malfunctioning display connects to a mobile device via a local network and provides an error description that can be displayed on the mobile device.

In one embodiment, the IHS detects a display failure and enters a wireless access point mode that enables a mobile device, such as a smart phone, to connect to the IHS. The IHS can either detect the failure automatically via a diagnostic routine run by the Basic Input/Output System (BIOS) of the IHS, or the IHS can be informed of the display failure manually by the user pressing a predefined hotkey combination. Once the display failure is detected, the IHS uses the wireless network to transmit a HyperText Markup Language (HTML) page that explains the cause(s) of the display failure. The mobile device then uses a web browser to display the HTML page on the mobile device, thereby enabling the user to read the error description and begin troubleshooting the failed display of the IHS.

In another embodiment, the IHS utilizes a multicast Domain Name System (mDNS) to establish a peer to peer connection with a mobile device. When the display failure is detected, the IHS announces itself over the mDNS and transmits a HTML page to a mobile device that is connected to the same local network as the IHS.

The present invention thus provides a clean and efficient way to facilitate the troubleshooting of a failed display unit of an IHS by enabling a user to see the error description on a mobile device when the user is otherwise unable to see output data on the failed display of the IHS. HTML based error descriptions are easier to understand than conventional beep or LED codes since the HTML page can contain descriptive text, component part numbers, contact information for technical support resources, and/or an artificial intelligence (AI) dialog that provides step by step instructions to the user. In addition, the AI dialog could also include location-based technical support contact information specific to the geographic location of the IHS based on the Internet Protocol (IP) address of the IHS.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a schematic circuit diagram illustrating one embodiment of an information handling system for remote diagnostics of a display device. In various embodiments, a network 100 may include one IHS 102A or multiple IHS(s) 102A-N. The IHS(s) 102A-N may be connected to wireless router 104 via a network cable 106, or via a wireless connection 108. Network 100 may also include mobile devices, such as smart phone 110 and/or tablet 112, that are also communicatively connected to wireless router 104 via wireless connections. In one embodiment smart phone 110 and/or tablet 112 are configured to exchange data with at least one of IHS(s) 102A-N over network 100.

Figure 2:
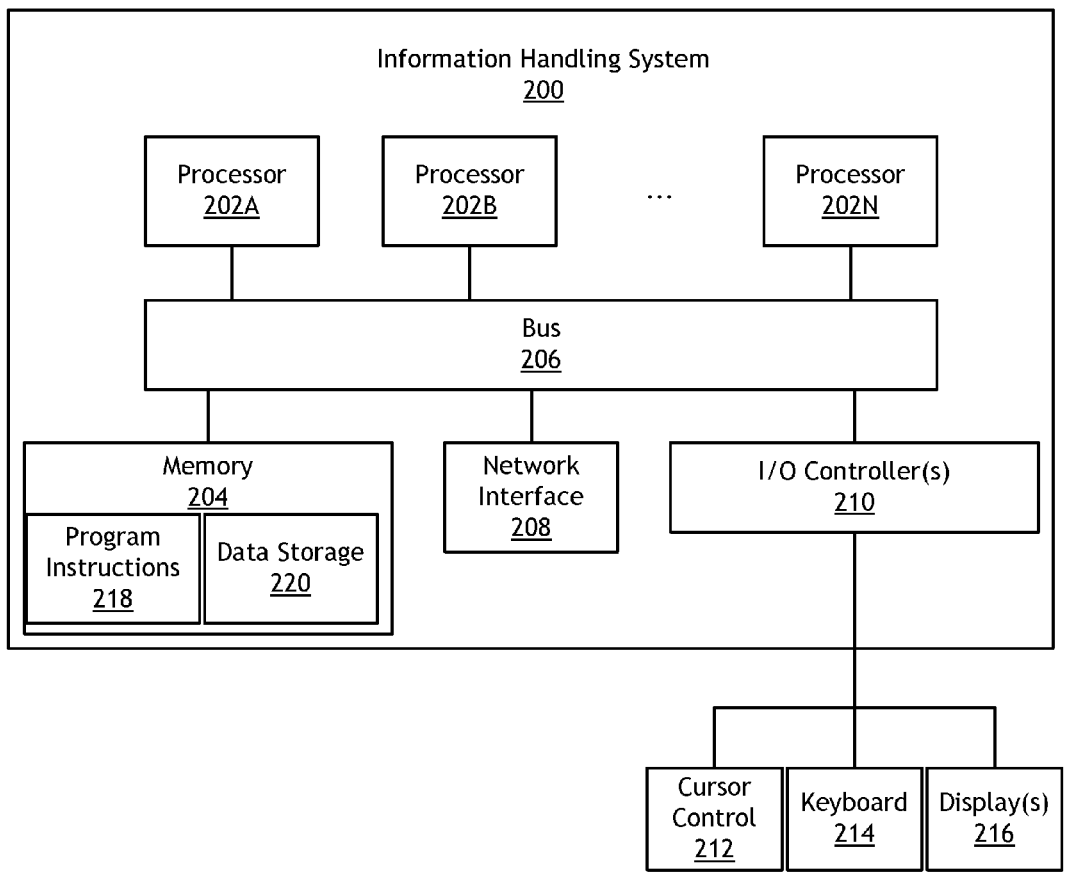
FIG. 2 is a schematic block diagram illustrating one embodiment of an information handling system configured for remote diagnostics of a display device.

FIG. 2 is a schematic block diagram illustrating one embodiment of an IHS 200 configurable for remote diagnostics of a display device. In one embodiment, IHS(s) 102A-N may be implemented on an information handling system similar to the IHS 200 described in FIG. 2. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. IHS 200 further includes network interface 208 coupled to bus 206, and input/output (I/O) controller(s) 210, coupled to devices such as cursor control device 212, keyboard 214, and display(s) 216. Display(s) 216 may be Liquid Crystal Displays (LCDs). In various embodiments a display may be integrated into IHS 200 and/or the display may be an external unit connected to IHS 200. In some embodiments, a given entity (e.g., IHS 102A) may be implemented using a single instance of IHS 200, while in other embodiments multiple such information handling systems, or multiple nodes making up IHS 200, may be configured to host different portions or instances of embodiments (e.g., IHS(s) 102A-N).

In various embodiments, IHS 200 may be a single-processor information handling system including one processor 202A, or a multi-processor information handling system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor information handling systems, each of processor(s) 202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, memory 204 may be used to store software program and/or event log shown in FIG. 6 and FIG. 7. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media—e.g., disk or CD/DVD-ROM coupled to IHS 200 via bus 206, or non-volatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N.

Network interface 208 may be configured to allow data to be exchanged between IHS 200 and other devices, such as smart phone 110 and/or tablet 112 connected to network 100, for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more information handling systems, such as IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 6 and FIG. 7. For example, program instructions 218 may be implemented in various embodiments using any desired programming language, scripting language, or combination of programming languages and/or scripting languages. Data storage 220 may include data that may be used in these embodiments. In other embodiments, other or different software elements and data may be included.

A person of ordinary skill in the art will appreciate that network 100 and IHS 200 are merely illustrative and are not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Embodiments of IHS(s) 102A-N described in FIG. 1 may be implemented in an information handling system that is similar to IHS 200. In one embodiment, the elements described in IHS(s) 102A-N may be implemented in discrete hardware modules. Alternatively, the elements may be implemented in software-defined modules which are executable by one or more of processors 202A-N, for example.

Figure 3:
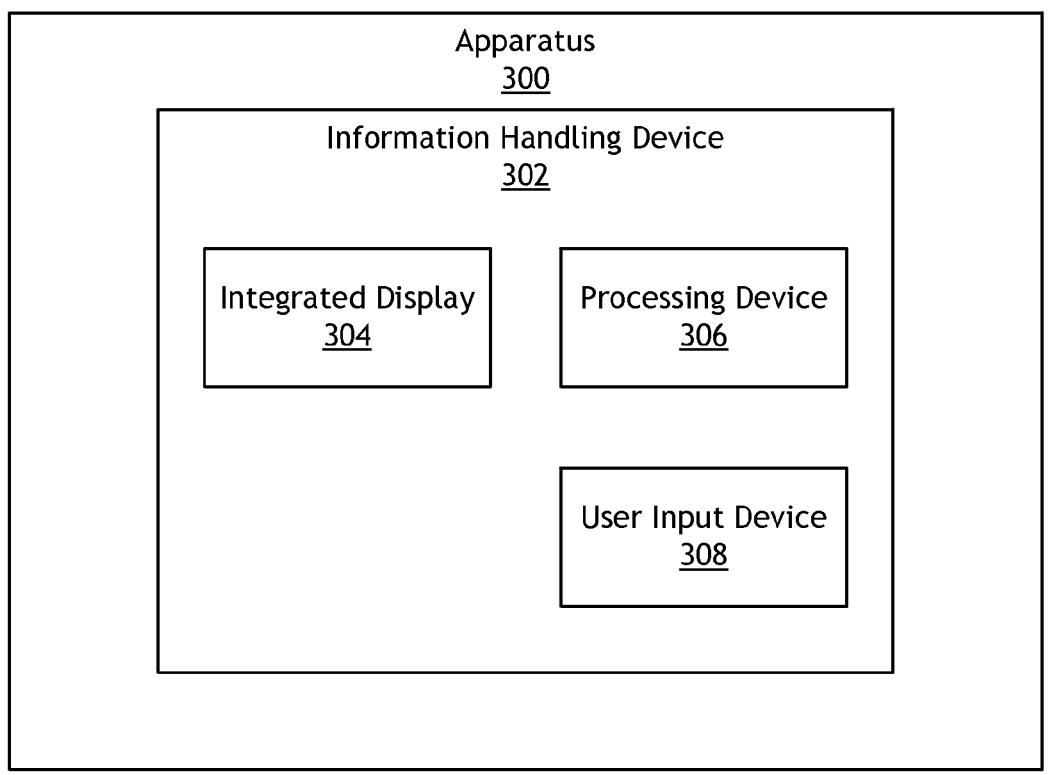
FIG. 3 is a schematic block diagram illustrating one embodiment of an apparatus configured for remote diagnostics of a display device.

FIG. 3 is a schematic block diagram illustrating one embodiment of an apparatus 300 configured for remote diagnostics of a display device. In one embodiment apparatus 300 includes an information handling device 302. Information handling device 302 includes an integrated display 304, a processing device 306, and a user input device 308. Integrated display 304 may be a LCD unit. User input device 308 may be a keyboard or the like. In one embodiment, processing device 306 executes one or more diagnostic routines in response to an error signal corresponding to a failure of integrated display 304. Processing device 306 establishes a peer to peer connection that enables an external device to connect wirelessly to information handling device 302. In one embodiment processing device 306 generates the error signal automatically in response to detecting a failure of integrated display 304. In another embodiment processing device 306 generates the error signal in response to a user of information handling device 302 pressing a pre-defined key combination on user input device 308.

Figure 4:
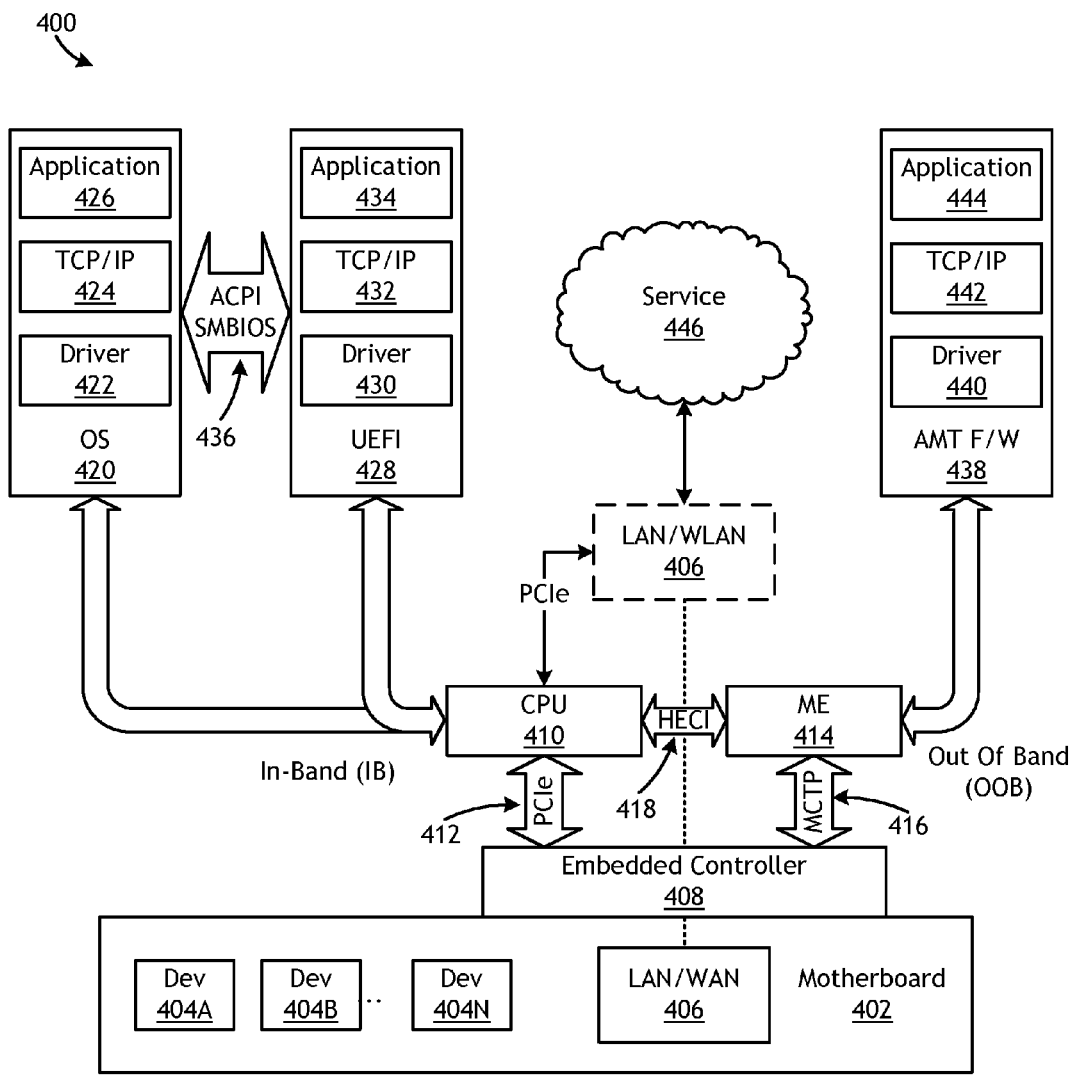
FIG. 4 is a schematic block diagram illustrating one embodiment of an information handling system for remote diagnostics of a display device.

FIG. 4 is a schematic block diagram illustrating one embodiment of an information handling system 400 for remote diagnostics of a display device. In one embodiment IHS 400 includes a motherboard 402. Motherboard 402 may include one or more devices 404A-N, a Local Area Network/Wide Area Network (LAN/WAN) card 406, and an embedded controller 408. Embedded controller 408 is connected to a Central Processing Unit (CPU) 410 via a Peripheral Component Interconnect express (PCIe) bus 412. Similarly, embedded controller 408 is connected to a Management Engine (ME) 414 via a Management Component Transport Protocol (MCTP) protocol 416. CPU 410 and ME 414 may be connected via a Host Embedded Controller Interface (HECI) 418.

In one embodiment, CPU 410 may be communicatively connected to an operating system (OS) 420 and/or a Unified Extensible Firmware Interface (UEFI) 428. OS 420 may include multiple software layers, such as driver 422, Transmission Control Protocol/Internet Protocol (TCP/IP) suite 424, and application layer 426. Similarly, UEFI 428 may also include multiple software layers, such as driver 430, TCP/IP 432, and application 434. In one embodiment OS 420 and UEFI 428 may communicate via an Advanced Configuration and Power Interface (ACPI) and/or System Management Basic Input/Output System (SMBIOS) 436.

In one embodiment, ME 414 may be communicatively connected to Active Management Technology (AMT) firmware 438. AMT firmware 438 may include multiple software layers, such as driver 440, TCP/IP 442, and application 444. In another embodiment IHS 400 also includes a remote service 446. Service 446 may provide data to IHS 400 via a cloud-based system.

Figure 5:
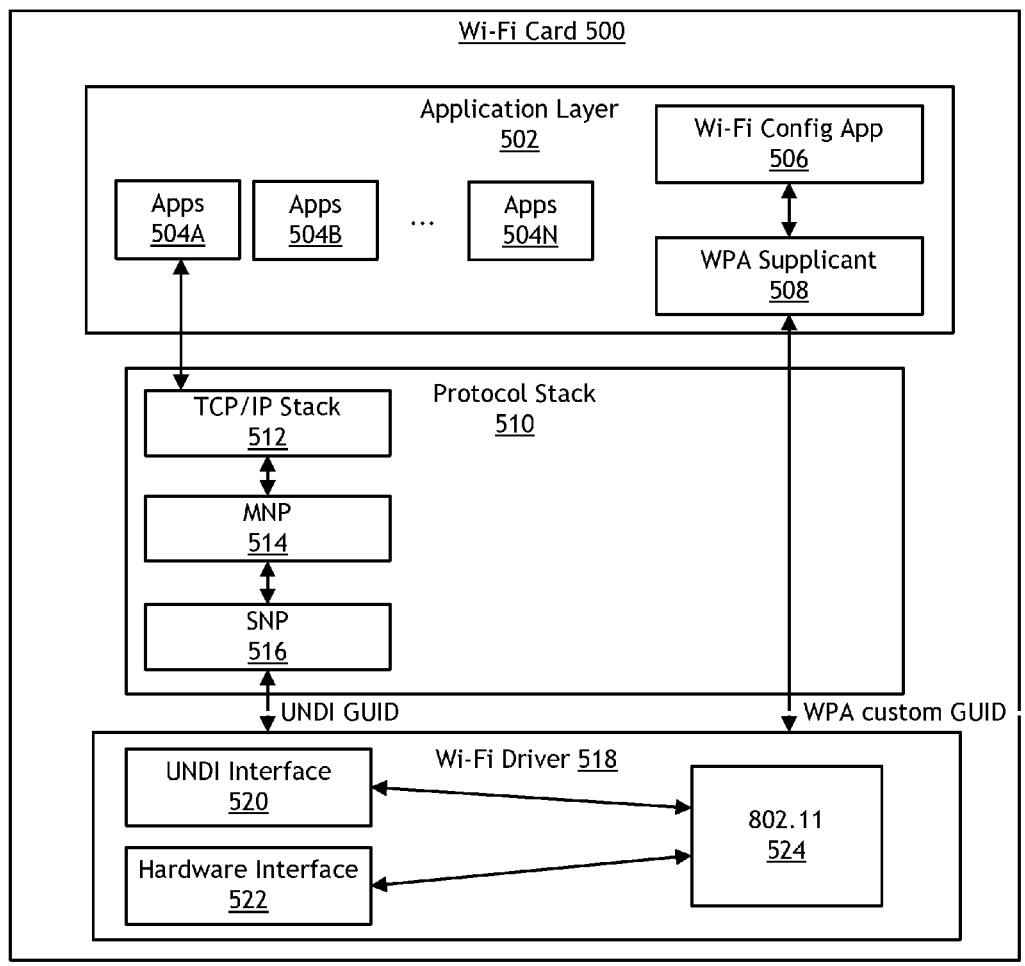
FIG. 5 is a schematic block diagram illustrating one embodiment of a software stack configured for remote diagnostics of a display device.

FIG. 5 is a schematic block diagram illustrating one embodiment of a software stack configured for remote diagnostics of a display device. In one embodiment Wi-Fi card 500 may include multiple layers, such as application layer 502, protocol stack 510, and Wi-Fi driver 518. Application layer 502 may include one or more applications 504A-N, a Wi-Fi configuration application 506, and a Wi-Fi Protected Access (WPA) supplicant 508. In one embodiment Wi-Fi configuration application 506 may communicate with WPA supplicant 508, which may in turn receive data from Wi-Fi driver 518 by utilizing a WPA Global Unique Identifier (GUID).

In one embodiment protocol stack 510 may include TCP/IP stack 512, a Microcom Networking Protocol (MNP) 514, and a Secure Network Programming (SNP) protocol 516. In another embodiment Wi-Fi driver 518 may include a Universal Network Device Interface (UNDI) 520, a hardware interface 522, and one or more wireless standards interfaces, for example 802.11 interface 524. SNP 516 may thus communicate with Wi-Fi driver 518 by using a UNDI GUID. In one embodiment Wi-Fi card 500 may be connected to motherboard 402 of FIG. 4.

Figure 6:
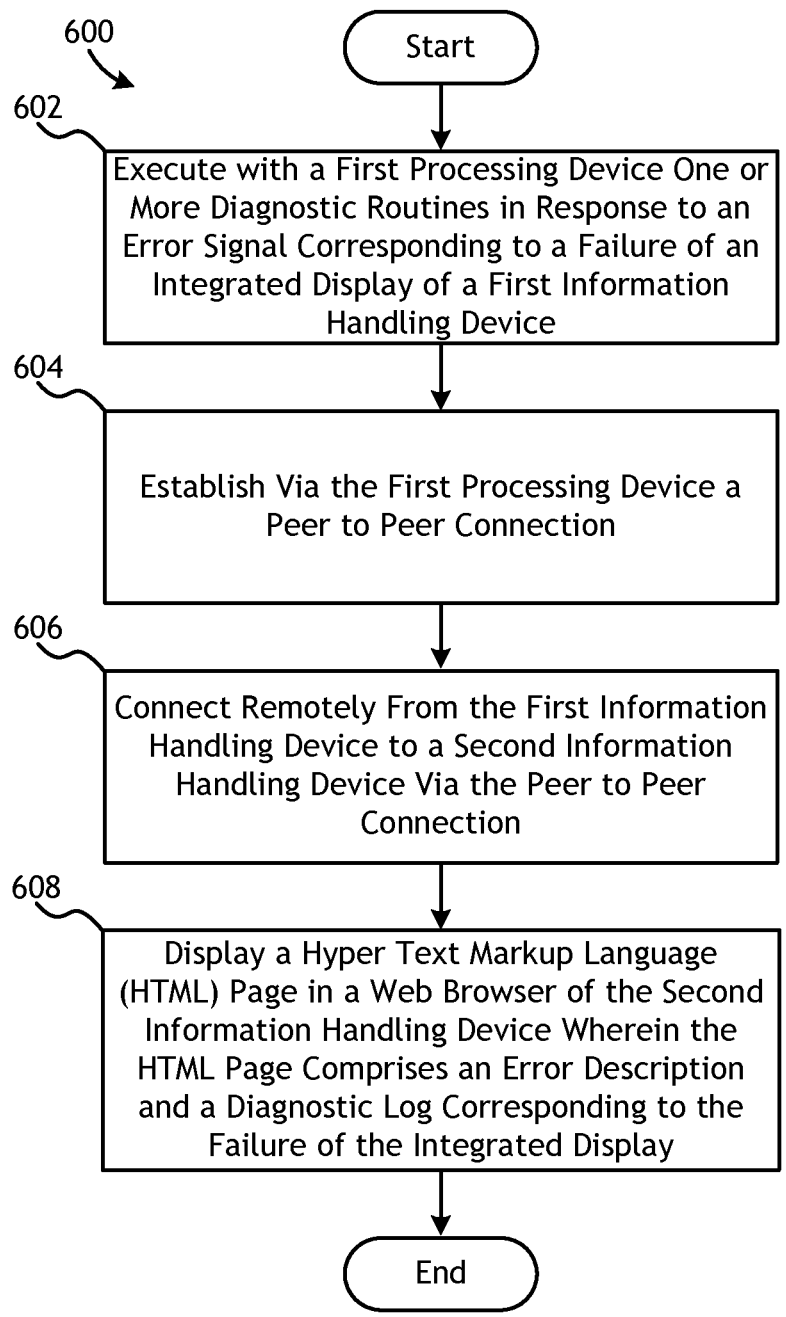
FIG. 6 is a schematic flowchart diagram illustrating one embodiment of a method for remote diagnostics of a display device.

FIG. 6 is a schematic flowchart diagram illustrating one embodiment of a method 600 for remote diagnostics of a display device. At block 602, the method 600 includes a processor, such as processor 202A of IHS 200, or firmware like a Basic Input/Output System (BIOS) implemented in IHS 200 executing one or more diagnostic routines related to display 216 in response to an error signal that corresponds to a failure or malfunction of display 216. In one embodiment the diagnostic routines may include re-initializing or "re-booting" IHS 200. In another embodiment, processor 202A generates the error signal automatically if display 216 fails. In an alternate embodiment, a user of IHS 200 may manually generate the error signal by pressing a pre-defined hot-key combination on keyboard 214. Possible hot-key combinations include, but are not limited to, simultaneously pressing a function key and the power button, or pressing an escape key and the power button.

As depicted in block 604, processor 202A establishes a peer to peer connection via network interface 208. In one embodiment establishing the peer to peer connection includes a Wi-Fi driver of IHS 200 eliciting IHS 200 to enter a wireless access point mode. In another embodiment establishing the peer to peer connection includes processor 202A triggering network interface 208 to announce the failure of display 216 within network 100 via a multicast Domain Name System (mDNS). In an alternate embodiment, establishing the peer to peer connection may include activating a mobile application installed on an external device in network 100, where the mobile application enables two-way (bi-directional) control of IHS 200 via the external device. For example, a mobile app installed on smart phone 110 could enable a user of smart phone 110 to adjust the display settings of IHS 200 via the peer to peer connection.

As shown in block 606, the peer to peer connection enables one or more external information handling devices connected to network 100, such as smart phone 110 and/or tablet 112, to connect remotely to IHS 200. As depicted in block 608, once an external information handling device is connected wirelessly to IHS 200 the external information handling device receives a HyperText Markup Language (HTML) page from IHS 200, and the external information handling device displays the HTML page using a web browser. In various embodiments the HTML page may include an error description corresponding to the failure of display 216, a diagnostic log that describes the results of the previously executed diagnostic routines, an event log describing the failure of display 216, and/or an artificial intelligence (AI) dialog including one or more suggested troubleshooting steps for the user to attempt.

In another embodiment, processor 202A may also generate location-based information, such as the Internet Protocol (IP) address of IHS 200, and utilize the location-based information to customize the troubleshooting steps of the AI dialog per the geographic location of IHS 200. Such customized troubleshooting steps may include phone numbers, mailing addresses, or websites of one or more local display repair locations. Similarly, the customized AI dialog may also include the warranty status and/or dates of previous failures of IHS 200 based on manufacturer records corresponding to the IP address.

Figure 7:
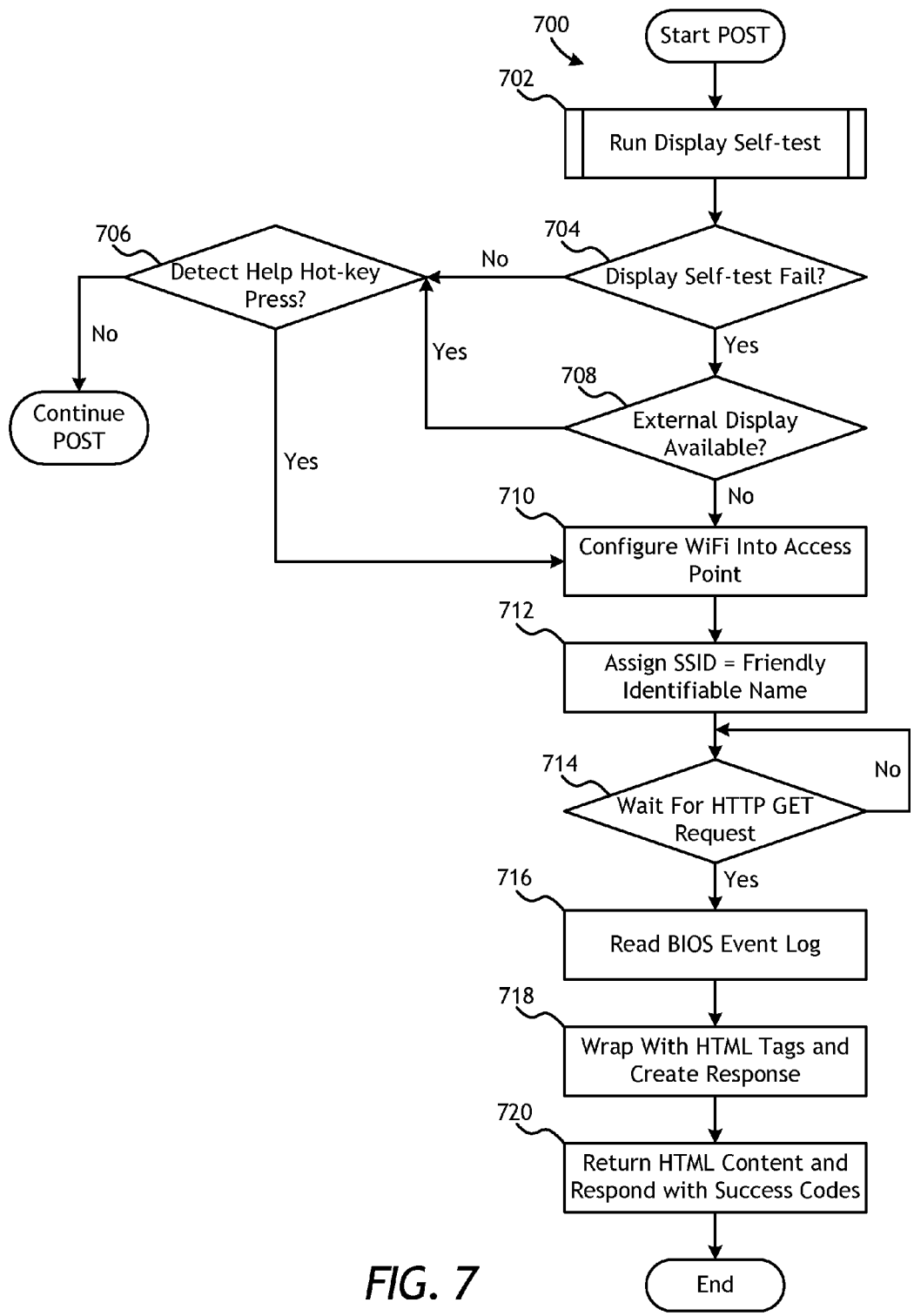
FIG. 7 is a schematic flowchart diagram illustrating another embodiment of a method for remote diagnostics of a display device.

FIG. 7 is a schematic flowchart diagram illustrating another embodiment of a method 700 for remote diagnostics of a display device. As shown in block 702, processor 202A initiates a display self-test of display 216. Processor 202A determines whether the display self-test resulted in a failure, as depicted in block 704. If the display self-test did not fail, then processor 202A communicates with I/O controller 210 to determine whether a pre-defined Help hot-key combination has been detected from keyboard 214. As discussed above, possible hot-key combinations include, but are not limited to, simultaneously pressing a function key and the power button, or pressing an escape key and the power button. If a help hot-key combination has not been detected, then processor 202A continues normal operation.

As shown in block 708, if the display self-test resulted in a failure, then processor 202A communicates with I/O controller 210 to determine if an alternate display, such as a secondary or external display, is connected to IHS 200 and available for use. In one embodiment, display availability may be defined as the alternate display being powered on and communicatively connected to IHS 200. If an alternate display is available, then processor 202A determines whether a pre-defined help hot-key combination has been pressed, as shown in block 706. If an alternate display is not available, then processor 202A uses network interface 208 to configure IHS 200 into a wireless access point, as shown in block 710. Similarly, if processor 202A detects that a help hot-key has been pressed, then processor 202A configures IHS 200 into a wireless access point.

As depicted in block 712, processor 202A assigns a friendly and identifiable name to be defined as the Service Set Identification (SSID) of IHS 200. In one embodiment the SSID may be the model name and/or information handling system name (if available) of IHS 200. For example, the SSID may be defined as "Latitude E7240" or the like.

Once IHS 200 is configured as a wireless access point, the user may attach a mobile device in network 100, such as smart phone 110 or tablet 112, to the wireless access point and launch the browser of the mobile device. As shown in block 714, processor 202A waits for a Hypertext Transfer Protocol (HTTP) GET request from a mobile device attached to the wireless access point. If a HTTP GET request is not detected, then processor 202A continues to wait. In one embodiment, the HTTP GET request may be a Uniform Resource Identifier (URI) request, such as "GET/index.html HTTP/1.1".

When a get request is received, processor 202A reads the BIOS event log to find the error code corresponding to the display failure and/or other display error logs, as shown in block 716. Processor 202A wraps the display error code and/or display error logs from the BIOS event log with HTML tags and thereby creates a response for the request from the mobile device, as depicted in block 718.

As shown in block 720, processor 202A utilizes network interface 208 to return the HTML content to the mobile device and respond with success codes. In one embodiment, the HTML content may include a message title, such as "LCD Failure", and/or descriptive body text, such as "Please go to www.dell.com/supportABC and enter the following code: XYZ123ABC!@#$." The user may then use the mobile device to navigate to the support site and thereby obtain additional information related to resolving the specific issue that caused the display failure of display 216.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of remotely communicating with an information handling device comprising:

executing, with a first processing device, one or more diagnostic routines in response to an error signal corresponding to a failure of an integrated display of a first information handling device;

establishing, via the first processing device, a peer to peer connection based on responding to the error signal corresponding to the failure of the integrated display;

connecting remotely from the first information handling device to a second information handling device via the peer to peer connection; and transmitting a HyperText Markup Language (HTML) page for display in a web browser of the second information handling device, wherein the HTML page comprises an error description and a diagnostic log corresponding to the failure of the integrated display.

2. The method of claim 1, wherein the first processing device comprises a Basic Input/Output System (BIOS).

3. The method of claim 1, wherein executing the one or more diagnostic routines further comprises initializing the first information handling device.

4. The method of claim 1, wherein establishing the peer to peer connection further comprises entering a wireless access point mode with a Wi-Fi driver.

5. The method of claim 1, wherein establishing the peer to peer connection further comprises announcing, with the first processing device, the failure of the integrated display via a multicast Domain Name System (mDNS) to one or more external information handling devices connected to a same local network as the first information handling device.

6. The method of claim 1, wherein the transmitted HTML page comprises customized troubleshooting steps for the first processing device.

7. The method of claim 6, wherein the customized troubleshooting steps for the first processing device comprise troubleshooting steps based on location information for the first processing device.

8. A remote diagnostic apparatus comprising:

a first information handling device having an integrated display; and a first processing device of the first information handling device, wherein the first processing device:

executes one or more diagnostic routines in response to an error signal corresponding to a failure of the integrated display;

establishes a peer to peer connection based on responding to the error signal corresponding to the failure of the integrated display;

connects remote from the first information handling device to a second information handling device via the peer to peer connection; and transmits information for display on the second information handling device, wherein the information comprises an error description and a diagnostic log corresponding to the failure of the integrated display.

9. The apparatus of claim 8, wherein the first processing device generates the error signal automatically in response to detecting the failure of the integrated display.

10. The apparatus of claim 8, wherein the first processing device generates the error signal in response to a user of the first information handling device pressing a predefined key combination on a user input device of the first information handling device.

11. A remote diagnostic system comprising:

a first information handling device having an integrated display;

a first processing device of the first information handling device, wherein the first processing device:

executes one or more diagnostic routines in response to an error signal corresponding to a failure of the integrated display; and establishes a peer to peer connection based on responding to the error signal corresponding to the failure of the integrated display; and a second information handling device communicatively connected to a same local network as the first information handling device, wherein:

the second information handling device remotely connects to the first information handling device via the peer to peer connection;

a browser of the second information handling device receives a HyperText Markup Language (HTML) page from the first information handling device; and the browser displays the HTML page on the second information handling device, wherein the HTML page comprises an error description and a diagnostic log corresponding to the failure of the integrated display.

12. The system of claim 11, wherein the first processing device comprises a Basic Input/Output System (BIOS).

13. The system of claim 11, wherein the first processing device re-initializes the first information handling device.

14. The system of claim 11, wherein the first processing device generates the error signal automatically in response to detecting the failure of the integrated display.

15. The system of claim 11, wherein the first processing device generates the error signal in response to a user of the first information handling device pressing a pre-defined key combination on a user input device of the first information handling.

16. The system of claim 11, further comprising a Wi-Fi driver configured to enter the first information handling device into a wireless access point mode.

17. The system of claim 11, further comprising a multicast Domain Name System (mDNS), wherein the first processing device establishes the peer to peer connection with one or more external information handling devices connected to a same local network as the first information handling device.

18. The system of claim 11, wherein the HTML page comprises an Artificial Intelligence (AI) dialog having one or more suggested troubleshooting steps to facilitate repairs to the display device.

19. The system of claim 18, wherein the one or more suggested troubleshooting steps comprise location-based information specific to the Internet Protocol (IP) address of the first information handling device.

20. The system of claim 11, further comprising a mobile application installed on the second information handling device, wherein the mobile application enables two-way control of the first information handling device via the peer to peer connection.

* * * * *